May 25, 1954 — J. R. PARSONS — 2,679,295
HELICOPTER BLADE JET COMBUSTION CHAMBER
Filed Dec. 30, 1949
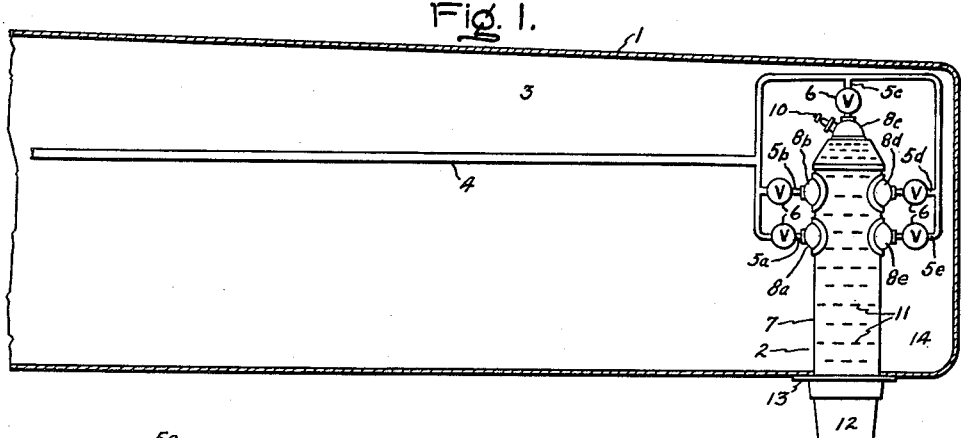
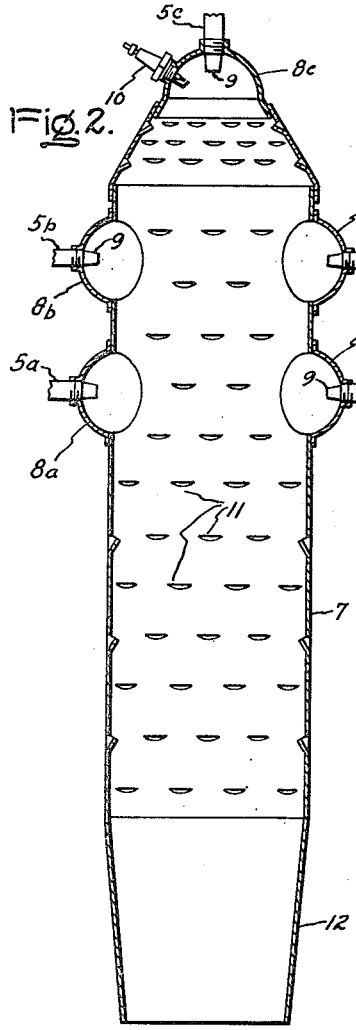
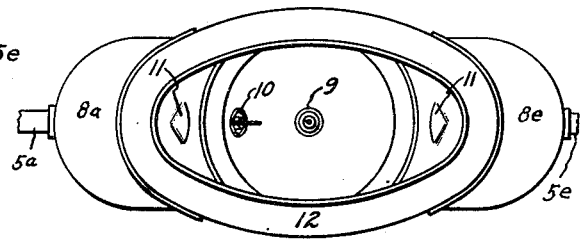
Inventor:
James R. Parsons,
by Paul A. Frank
His Attorney.

Patented May 25, 1954

2,679,295

UNITED STATES PATENT OFFICE 2,679,295

HELICOPTER BLADE JET COMBUSTION CHAMBER

James R. Parsons, Ballston Spa, N. Y., assignor to General Electric Company, a corporation of New York Application December 30, 1949, Serial No. 135,932

2 Claims. (Cl. 170—135.4)

This invention relates to combustion chambers and, in particular, to an improved structure for a combustion chamber installed at the tip of a rotating blade or the like.

Combustion chambers installed at blade tips drive a blade by means of a thrust produced by products of combustion escaping from the chamber. For changes in operating conditions, it is desirable that the driving thrust be variable. With a constant air weight flow, the thrust produced by a combustion chamber is variable by varying its operating temperature.

While the idea of varying the temperature within a combustion chamber is not new in itself, there has long been the desire to produce a combustion chamber that has a maximum burning efficiency over a wide range of temperatures.

In the usual variable temperature combustion chamber, the temperature is controlled by regulating the amount of fuel that is supplied to the combustion chamber; for example, the pressure on the fuel might be varied to increase or decrease the fuel supply rate. Nozzles, however, have an optimum rating for maximum burning efficiency within a combustion chamber. For instance, a nozzle might be rated at 11 gallons per hour at 60 degrees at 100 p. s. i. This rating means that under those conditions the fuel, as it passes through a nozzle, is atomized to produce a plurality of small fuel particles of a size that readily intermingles with combustion air to permit complete combustion of the fuel. As the fuel rate is decreased below optimum rating, the atomization of the fuel is poor and it emanates from the nozzle in droplets that do not properly intermingle with combustion air; consequently, the fuel is not completely burned.

It is an object of this invention to provide a combustion chamber of unique structure that can be operated over a range of temperatures at optimum efficiency.

It is a further object of this invention to provide a new and improved combustion chamber wherein the metal portions of the chamber are maintained at a low operating temperature, while temperatures great enough to injure these portions exist within the chamber.

It is a still further object of this invention to provide a new and improved combustion chamber wherein the fuel is mixed with combustion air in a manner that produces complete combustion.

Broadly, this invention comprises a combustion chamber wherein a plurality of fuel nozzles are installed one in each of a plurality of mixing domes. Fuel and air are mixed, and the fuel is partially burned within these domes, while complete combustion takes place within the combustion chamber proper. The fuel nozzles are arranged to permit operation at optimum efficiency of any or all of the nozzles to produce a wide range of temperatures within the chamber.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Referring to the drawing, Fig. 1 is a diagrammatic view of a combustion chamber installed at the wing tip of a helicopter blade; Fig. 2 is a plan view, partly in section, of the burner; while Fig. 3 is an end view of the burner.

In the drawing, a hollow rotor blade 1 is shown having a combustion chamber or burner unit 2 installed adjacent its substantially outer extremity. Air is supplied to the burner through the hollow center 3 of blade 1, while fuel is supplied through a conduit 4 that extends through blade 1 to the burner from the aircraft cabin (not shown). Adjacent the burner, conduit 4 is divided into a plurality of branch lines 5a, 5b, 5c, 5d and 5e, each having a valve 6 operable at the pilot's control from within the plane by a means (not shown). The means could be a solenoid valve or the like.

Burner 2 comprises a shell 7 of heat resistant metal which, in accordance with this drawing, is shown as being oval shaped, but shell 7 need not be limited to any particular configuration. A plurality of domes or protrusions 8a, 8b, 8c, 8d, and 8e are shown spaced about burner 2. Dome 8c is positioned at the longitudinal axis of the burner, while the other domes are shown symmetrically spaced about shell 7. Each dome is hollow and at its greatest cross section joins the combustion chamber shell 7. Fuel nozzles 9 are indicated positioned at the axis of the domes in which they are installed. The fuel nozzles are supplied with fuel from conduit 4 through branch lines 5a—5e, respectively. An igniter 10 is positioned in dome 8c for initiating combustion within the chamber. While only one igniter 10 is shown, it is to be understood that it would involve no departure from this invention to provide an igniter in each of the domes.

Shell 7 is provided with a plurality of louvers 11 which are symmetrically spaced about the periphery of the shell. The louvers, which are slits transverse to the longitudinal axis of the chamber, are so positioned that alternate rows are staggered to provide admission of a film of air that completely envelopes the inner wall of the shell 7. As a typical example, which is not meant to be a limitation to the scope of this invention, it has been found that if 33 rows of louvers (all of which are not shown) are equally spaced along a 45 inch axial length of shell 7 that adequate combustion air is supplied to the burner. A thrust nozzle 12 is provided at the trailing edge of burner 2 to conduct the products of combustion from it. The escaping products of combustion produce a thrust that drives the rotor blade.

A flange 13 is positioned between thrust nozzle 12 and shell 7 to position and secure burner 2 within the hollow rotor blade. A plurality of openings (not shown) are placed within flange 13 to accommodate bolts or rivets or the like for securing the burner to the rotor blade.

At the outer tip of the hollow blade, a plenum chamber 14 is formed in hollow center 3 of blade 1 between burner 2 and the inner periphery of the blade. Compressed air is supplied from the cabin of the aircraft through the hollow rotor blade to plenum chamber 14; consequently, the air is supplied to the burner at 90 degrees to the direction of the resulting escaping products of combustion. The air is sent through only one 90 degree bend as it enters the burner and there is not the resulting pressure drop that takes place when air is admitted to the plenum chamber axially of a burner. The details of the admission of air to a burner at right angles to the resulting thrust is described in more complete detail in a copending application Serial No. 149,913, filed March 16, 1950, Alonzo W. Noon, now abandoned, assigned to the same assignee as the assignee of the present invention.

Compressed air from plenum chamber 14 enters shell 7 through louvers 11 which, because of the spacing, continuously supply an envelope of cool air to the inner surface of shell 7, thus maintaining it at a lower and safer temperature than the actual burner temperature which exists towards the axial center of burner 2. Because of these louvers, operating temperatures are tolerated which are much higher than those that can be withstood by present day heat resistant metals.

As has been previously discussed, a plurality of domes 8a–8e are symmetrically spaced in one plane longitudinally of shell 7. Air from within burner 2 eddies into these domes to provide primary combustion air for fuel that is injected into a dome through nozzles 9. The fuel passing into these domes is controlled by valves 6, which are under the control of the operator of the plane; consequently, by opening or closing these valves, the operator can vary the amount of fuel supplied to burner 2.

For optimum efficiency of operation, the pressure at each fuel nozzle 9 is maintained at the pressure for which it was designed; consequently, a predetermined amount of fuel is injected through each nozzle. The pressure of the fuel can, of course, be varied within certain limits without detracting from this invention, but it is desirable to maintain the fuel pressure at optimum.

Since the operating temperature of a burner is dependent upon the amount of fuel that is burned in it, it can be seen that by employing a plurality of fuel injecting nozzles each operated at optimum fuel rates, the temperature of operation of the burner is controllable over a wide range to produce a predetermined temperature and thrust.

In operation of this improved combustion chamber, combustion is initiated by supplying a quantity of fuel to dome 8c through nozzle 9 and then igniting this mixture with igniter 10. This swirling burning mass thus produced travels axially along shell 7 past the other domes. As fuel is supplied through the other nozzles, it impinges upon the swirling burning mass and ignites to initiate a primary burning within that dome. The products of combustion from that dome pass into the main stream within shell 7 where supplemental or secondary air is added from the louvers 11 to completely burn the fuel. By injecting fuel into a dome instead of into the air stream and burning it in primary air, the fuel particles are prewarmed before entering the main combustion chamber and consequently do not tend to lower the operating temperature of the chamber proper. Complete combustion of the fuel particles takes place in the combustion chamber proper.

Igniter 10 need be activated only long enough to initiate a burning within shell 7, since this burning is self-propagating, or sustaining burning, not being intermittent as the combustion which takes place within the cylinder of an automobile.

With the structure of this invention as thus described, it has been found the this burner has an optimum burning efficiency at a range of fuel to air proportions from .033 to .004 which produce a range of temperatures from 2800° F. down to 300° F. with no over-heating of the surface of shell 8 and with little metal discoloration due to heat.

Other factors in combustor design have considerable influence on the performance of a burner. The effects of combustor inlet pressure, approach velocity, inlet temperature, and inlet area proportions are all primary variables. The results which have been shown were determined with all the factors constant except the rate of fuel injection.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. In a helicopter provided with a plurality of hollow rotatable blades, a jet propulsion unit positioned at the outer extremities of each of said blades, said propulsion unit being arranged to produce a thrust to drive said blade, means for conducting fuel and air through each of said hollow blades to its said propulsion unit, each of said hollow blades and said propulsion units defining a plenum chamber, said air conduit means being arranged to admit air to said plenum chamber at right angles to the direction of thrust of said propulsion unit, said propulsion unit comprising a combustion chamber, a thrust nozzle, and means for securing said unit to said blade, said combustion chamber being defined by a shell of heat resistant metal provided with a plurality of dome-shaped protrusions, each of said protrusions being provided with a fuel injection nozzle, one of said protrusions being further provided with an igniter means, each of said fuel injection nozzles being connected to said fuel conduit means by a branch conduit, a valve interpositioned in each of said branch conduits between said fuel conduit means and said fuel nozzles, means for regulating said valves whereby fuel can be directed through one or more of said nozzles, said shell further being provided with the plurality of louvres for admitting air from said plenum chamber to said combustion chamber, said louvres being spaced in rows with louvres in successive rows being intermittently spaced to provide an envelope of cooling air for the inner periphery of said shell, whereby fuel at a variable rate and a predetermined pressure and air at a fixed rate are admitted to said combustion chamber and burned with the products of combustion exiting through said thrust nozzle to drive said hollow blades.

2. A combustion chamber comprising an elongated tubular shell having a plurality of apertures in the periphery thereof, a plurality of hemispherically shaped domes directly positioned on said shell across said apertures, means for injecting fuel into each of said domes, ignition means positioned in one of said domes, means for controlling the rate of fuel supply to said injecting means, and a plurality of louvers positioned substantially throughout the entire length of said shell for supplying air to said combustion chamber.

References Cited in the file of this patent

UNITED STATES PATENTS

| Number | Name | Date |
|---|---|---|
| 1,820,946 | Pitcairn | Sept. 1, 1931 |
| 2,286,909 | Goddard | June 16, 1942 |
| 2,458,497 | Bailey | Jan. 11, 1949 |
| 2,465,525 | Goddard | Mar. 29, 1949 |
| 2,482,260 | Goddard | Sept. 20, 1949 |
| 2,485,502 | McCollum | Oct. 18, 1949 |
| 2,518,000 | Goddard | Aug. 8, 1950 |
| 2,526,222 | Goddard | Oct. 17, 1950 |

FOREIGN PATENTS

| Number | Country | Date |
|---|---|---|
| 27,087 | Great Britain | Aug. 17, 1911 |
| 275,677 | Great Britain | Mar. 22, 1928 |
| 423,590 | France | Feb. 20, 1911 |
| 648,107 | France | Aug. 7, 1928 |